(No Model.)
H. KUHN.
VIGNETTER.
No. 369,453.  Patented Sept. 6, 1887.
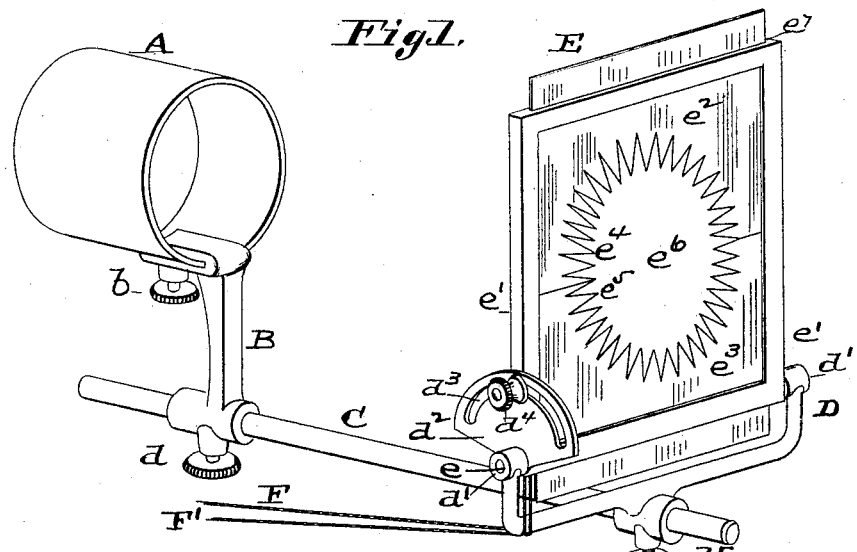
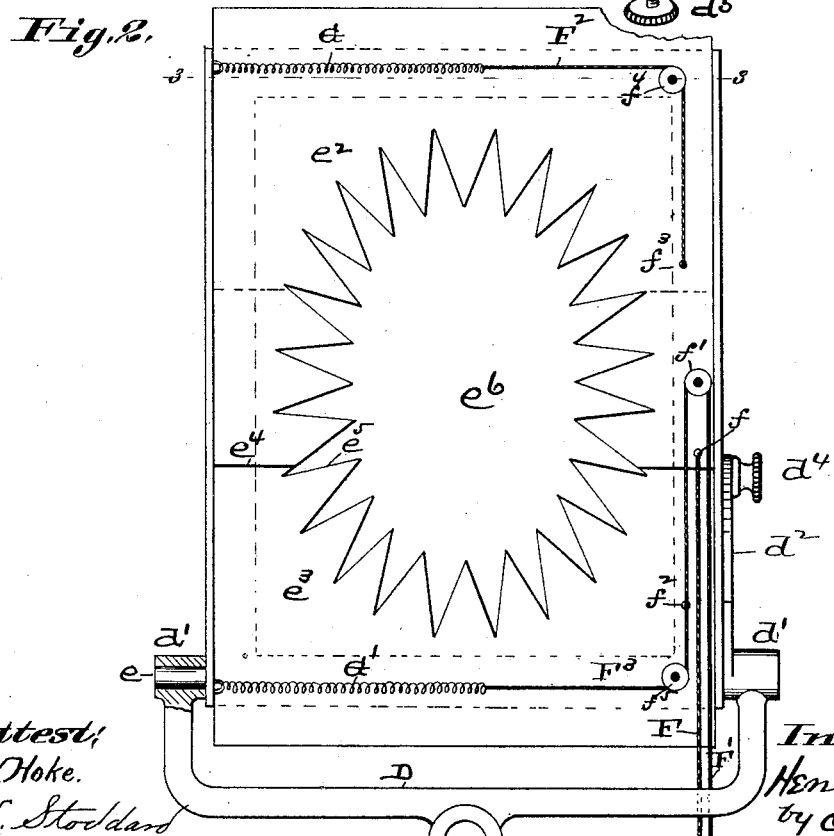
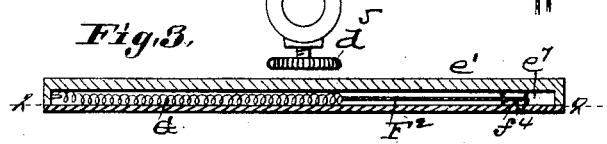
Attest:
J. W. Hoke.
F. L. Stoddard
Inventor:
Henry Kuhn
by C D Moody
atty

United States Patent Office.

HENRY KUHN, OF ST. LOUIS, MISSOURI.

VIGNETTER.

SPECIFICATION forming part of Letters Patent No. 369,453, dated September 6, 1887.

Application filed September 17, 1885. Renewed May 10, 1887. Serial No. 237,745. (No model.)

*To all whom it may concern:*

Be it known that I, HENRY KUHN, of St. Louis, Missouri, have made a new and useful Improvement in Vignetters, of which the following is a full, clear, and exact description.

The improvement relates to that class of devices used by photographers in taking a picture upon a negative.

The present vignetter can be and in use is attached to the camera and quite close in front of the camera-tube, and so that it can be adjusted toward and from the tube, and so that it can be inclined from a perpendicular toward and from the tube. The vignetter can also be expanded and contracted, and at the will of the operator when in position for sighting through the camera.

The annexed drawings, making part of this specification, exhibit the most approved mode of carrying out the improvement.

Figure 1 is a view in perspective, showing the vignetter attached to a camera-tube as in use. Fig. 2 is a vertical section, upon an enlarged scale, of the vignetter, the section being on the line 2 2 of Fig. 3; and Fig. 3 is a horizontal section on the line 3 3 of Fig. 2.

The same letters of reference denote the same parts.

A, Fig. 1, represents the forward end of the tube of an ordinary camera. A bracket, B, by means of the set-screw $b$, is secured thereto. The bracket holds a rod, C, which projects to the front end of the tube, and at or toward its forward end supports a cross-arm, D, which in turn upholds the vignetter E. The set-screw $a$ serves to tighten the rod in the bracket at the desired point of adjustment therein. The cross-arm, carrying the vignetter, can be slipped upon the rod so as to bring the vignetter nearer to or farther from the tube, and when the vignetter is thus adjusted the set-screw $d^5$ is used to tighten the cross-arm upon the rod. The cross-arm is provided with bearings $d'$ $d'$, to receive the journals $e$ $e$ of the vignetter, and thereby provide for inclining the vignetter toward and from the camera-tube. The preferable means for adjusting the vignetter in this last-named respect is that shown, the cross-arm being furnished with a quadrant, $d^2$, slotted at $d^3$, and a set-screw, $d^4$, passing through the slot into the vignetter-frame $e'$ and adapted to bind the vignetter-frame at the desired angle of adjustment to the quadrant.

The vignetter consists, preferably, of the plates $e^2$ $e^3$ and the frame $e'$. One of the plates is in the upper part of the frame and the other of the plates is in the lower part of the frame. Their opposing edges $e^4$ $e^5$ are made to lap, and are similarly, or thereabout, shaped out and scalloped to form, in conjunction, a vignetter-opening, $e^6$, substantially as shown. The frame $e'$ is constructed so that the plates $e^2$ $e^3$ can be slipped therein toward and from each other, and the opening $e^6$ thereby contracted and enlarged. To enable this last-described adjustment to be effected by the operator when in the rear of the camera, as when adjusting it, the cords F F' F² F³ and the springs G G' are employed. The cords F F' lead from the rear of the camera forward, and, after passing over suitable bearings, substantially as shown in Fig. 1, for enabling them to draw the vignetter-plates in the slot $e^7$ in the frame $e'$, connect, respectively, with the plates $e^2$ $e^3$. The cord F connects directly with the plate $e^2$ at $f$. The cord F' passes around the sheave $f'$ and then connects with the plate $e^3$ at $f^2$. By pulling the cords F F' the plates $e^2$ $e^3$ are drawn toward each other to increase their lap, and thereby to diminish the opening $e^6$. On releasing the cords F F', the springs G G' and cords F² F³ act to draw the plates $e^2$ $e^3$ apart to diminish their lap, and thereby to enlarge the opening $e^6$. The springs at one end are fastened to the frame $e'$, and from the other end the cord F² F³ lead and connect, respectively, with the plates $e^2$ $e^3$ at $f^3$ $f^2$, the cords between their points of connection passing, respectively, around the sheaves $f^4$ $f^5$.

The vignetter can be detached from the camera-tube by loosening the set-screw $b$. I desire not to be limited to any special means for attaching the vignetter to the camera-tube.

I claim—

1. The combination of a camera, a vignetter-plate consisting of a plurality of sections arranged around a central opening, a holder for said sections, a bracket and clamp for connecting said holder with and supporting it at a distance from the camera, and adjusting devices for regulating the positions of said sections, said devices extending to the camera within reach of the operator, substantially as set forth.

2. The combination of a vignetter-plate consisting of a plurality of adjustable sections, as described, a holder for said sections, a support for said holder, a hinge-connection between the holder and support, and adjusting devices for regulating the distance of said parts from the camera, substantially as set forth.

3. The combination of a vignetter-plate consisting of a plurality of sections, a holder in which said sections are adjustable, springs for actuating said sections in one direction in their holder, and a system of cords and pulleys for actuating said sections in the opposite direction, substantially as set forth.

4. The combination of the cords $F$ $F'$ $F^2$ $F^3$, the springs $G$ $G'$, the bearings $f'$ $f^4$ $f^5$, the frame $e'$, and the parts $e^2$ $e^3$, as and for the purpose described.

5. The combination of the vignetter E with means, substantially as described, whereby it may be secured to or removed from a camera-tube of the usual character, consisting of a detachable clamp, B, a rod secured to said clamp, and a holder for the vignetter, adjustable on said rod, as set forth.

6. In combination with a camera, the vignetter E, journaled at $e$ $e$ in a holder, D, for the purpose described.

7. The combination of a camera, a vignetter-plate consisting of two sections arranged upon diametrically-opposite sides of a central opening and overlapping at the other sides of the opening, a holder having ways for supporting and guiding said sections and supported at a distance from the camera, and adjusting devices for regulating the position of said sections and the size of said opening, and cords extending to within reach of the operator at the camera for operating said devices, as set forth.

Witness my hand.

HENRY KUHN.

Witnesses:
C. D. MOODY,
D. W. A. SANFORD.